(12) United States Patent
Xu et al.

(10) Patent No.: US 10,548,416 B2
(45) Date of Patent: Feb. 4, 2020

(54) LED FRAME STRUCTURE FOR A KIOSK

(71) Applicant: Google LLC, Mountain View, CA (US)

(72) Inventors: Li Xu, San Francisco, CA (US); Nicholas Joseph Scalzi, San Francisco, CA (US); Victoria A. Spielmann, Piedmont, CA (US); Christopher Graham Tewksbury, Fairfax, CA (US)

(73) Assignee: GOOGLE LLC, Mountain View, CA (US)

( * ) Notice: Subject to any disclaimer, the term of this patent is extended or adjusted under 35 U.S.C. 154(b) by 80 days.

(21) Appl. No.: 15/850,260

(22) Filed: Dec. 21, 2017

(65) Prior Publication Data

US 2019/0191894 A1    Jun. 27, 2019

(51) Int. Cl.
| | |
|---|---|
| *F21V 21/00* | (2006.01) |
| *A47F 5/00* | (2006.01) |
| *F21V 21/088* | (2006.01) |
| *F21V 23/00* | (2015.01) |
| *F21V 3/00* | (2015.01) |
| *H05B 37/02* | (2006.01) |
| *F21Y 115/10* | (2016.01) |

(52) U.S. Cl.
CPC .............. *A47F 5/0043* (2013.01); *F21V 3/00* (2013.01); *F21V 21/088* (2013.01); *F21V 23/001* (2013.01); *F21V 23/003* (2013.01); *H05B 37/0227* (2013.01); *F21Y 2115/10* (2016.08)

(58) Field of Classification Search
CPC ........ A47F 5/0043; F21V 3/00; F21V 21/088; F21V 23/001; F21V 23/003; H05B 37/0227; F21Y 2115/10

USPC .......... 362/127, 125, 132, 133, 234, 249.02, 362/249.06, 249.14, 253
See application file for complete search history.

(56) References Cited

U.S. PATENT DOCUMENTS

| | | | | |
|---|---|---|---|---|
| 3,838,266 | A * | 9/1974 | Jonathan ................. | A47F 11/10 312/117 |
| 8,562,167 | B1 * | 10/2013 | Meier .................. | A47B 96/021 362/125 |
| 2003/0151911 | A1 * | 8/2003 | Chen ....................... | A47F 3/001 362/132 |
| 2011/0283632 | A1 | 11/2011 | Sutton et al. | |
| 2014/0153241 | A1 * | 6/2014 | Templeton ............ | G09F 27/008 362/249.02 |
| 2015/0317121 | A1 * | 11/2015 | Cope ....................... | G09F 9/33 345/1.3 |

* cited by examiner

*Primary Examiner* — Laura K Tso

(74) *Attorney, Agent, or Firm* — Leason Ellis LLP

(57) ABSTRACT

An interactive display for a kiosk for mounting on an existing retail structure in order to display one or more objects comprises an LED module frame having an edge having a coating and a grid, the grid including a plurality of mountings adapted to support LED modules, and one or more LED modules comprising an array of LEDs, the modules being removably supported on the mountings, and one or more removable filler panels adapted to occupy any of the plurality of mountings that do support an LED module, wherein the one or more filler panels are coated in a similar manner to the edge of the frame. Also, an assembly for inclusion in a kiosk comprises a frame, LED modules and filler panels supported on a continuous plane, and a translucent panel supported in front of the continuous plane.

15 Claims, 9 Drawing Sheets

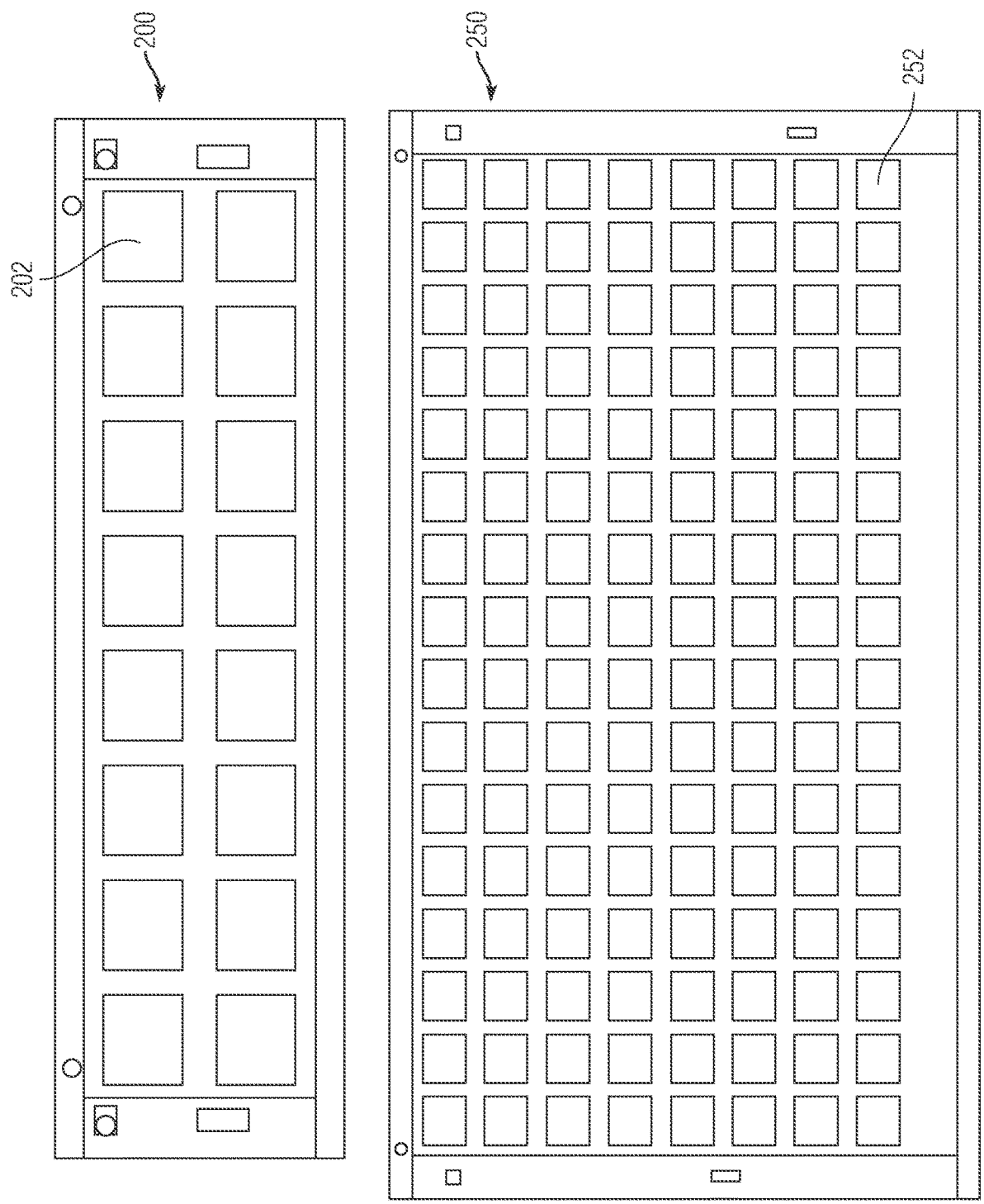

LED FRAME STRUCTURE FOR A KIOSK

FIELD OF THE INVENTION

The present invention relates to improvements in kiosks and related displays, and, in particular, relates to an interactive kiosk having a frame structure for support modular light emitting diode (LED) modules and other components.

BACKGROUND OF THE INVENTION

Computer-enabled interactive kiosks offer retailers the ability to advertise, display products, and provide a wealth of product information, both visual and auditory, in a small, accessible installation. The multi-functionality of such kiosks provides retailers with opportunities to enhance the aesthetic appeal of its product offering for attracting customers, and they can also foster a consistent set of visual and auditory features that customers may come to associate with a particular brand.

The use of display screens has increased in frequency in connection with kiosks and other retail store displays, and that has concomitantly made such applications of displays more ordinary. Consequently, retailers and brand owners have a problem in using technology to increase brand and product awareness while providing a distinctive visual format for their customers. Moreover, as product offerings change, the requirements for the display should likewise be adapted, and that too can cause a retail store to have to replace its kiosk entirely, which is associated with waste, storage and substantial effort to reconfigure the display area.

What is therefore needed is an apparatus which displays products consistently within an interactive kiosk installation which can be adapted to meet the needs of a retailer for changing product offerings in a visually interesting and appealing way. The subject invention addresses these and other needs.

SUMMARY OF THE INVENTION

In accordance with one aspect of the invention, an interactive display for a kiosk for mounting on an existing retail structure in order to display one or more objects comprises an LED module frame having an edge having a coating and a grid, the grid including a plurality of mountings adapted to support LED modules, and one or more LED modules comprising an array of LEDs, the modules being removably supported on the mountings, and one or more removable filler panels adapted to occupy any of the plurality of mountings that do support an LED module, wherein the one or more filler panels are coating in a similar manner to the edge (that is, perimeter) of the frame.

In more particular arrangements consistent with this aspect of the invention, one or more embodiments can include some or all the following features: the coating on the supporting frame can have a color generally corresponding to a filler panel color; the surface panel can be translucent; the surface panel can be an acrylic; and each LED array can be removably connected to the support frame.

In still more particular arrangements, embodiments of the invention have filler panels and LED modules sized to be compatible with one another such that one or more LED modules can be swapped in position on the LED module frame for one or more filler panels. In one specific arrangement, at least one filler panel is the same size as the LED module. In another specific arrangement, at least one filler panel is the same size as two LED modules, such that two LED modules can be swapped in position on the LED module frame for one filler panel.

Moreover, one or more embodiments can include some or all the following features, a processor can be coupled to and adapted to control each of the LED modules, and can be configured by code executing therein to detect and respond to the presence and location of the LED modules within the frame, or to their absence.

In connection with a further aspect of the invention, an assembly for inclusion in a kiosk comprises an LED module frame, one or more LED modules, and one or more filler panels, disposed behind a translucent panel. In embodiments of the invention that include this assembly, the LED module frame has a first color and defines an internal grid, with the grid including a plurality of mountings adapted to support LED modules. The LED modules each comprise an array of LEDs, and each is removably supported on the mounting. The filler panels are removeable and have a color that substantially matches the first color of the LED module frame. Each filler panel is adapted to occupy any of the plurality of mountings that in place of an LED module so as to define, together with any LED modules supported on the mountings a continuous plane; and.

In accordance with this aspect of the invention, any of the more particular arrangements described above apply with equal advantage. As such, embodiments of the invention have filler panels and LED modules sized to be compatible with one another such that one or more LED modules can be swapped in position on the LED module frame for one or more filler panels. In one specific arrangement, at least one filler panel is the same size as the LED module. In another specific arrangement, at least one filler panel is the same size as two LED modules, such that two LED modules can be swapped in position on the LED module frame for one filler panel. Moreover, one or more embodiments can include some or all the following features, a processor can be coupled to and adapted to control each of the LED modules, and can be configured by code executing therein to detect and respond to the presence and location of the LED modules within the frame, or to their absence.

These and other features, aspects and advantages of the invention will be apparent from the following discussion of the drawings and certain embodiments of the invention.

BRIEF DESCRIPTION OF THE DRAWINGS

FIGS. 7A and 7B are front plan views of exemplary frames for supporting LED modules in an interactive kiosk according to embodiments of the present invention.

DETAILED DESCRIPTION CERTAIN OF EMBODIMENTS OF THE INVENTION

Figure 1:
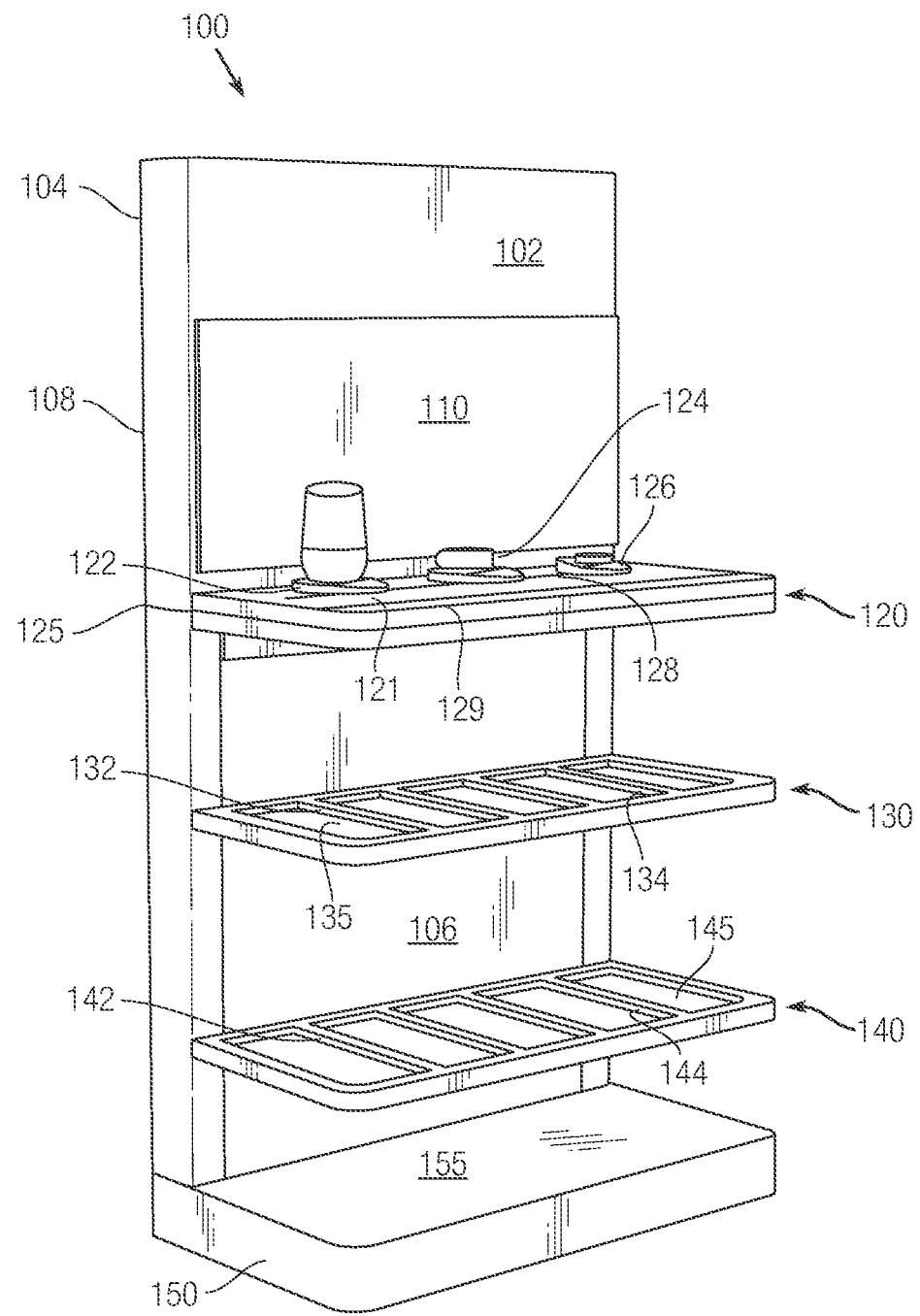
FIG. 1 is a perspective view of an interactive kiosk according to an embodiment of the present invention.

The following disclosure describes embodiments of an interactive kiosk having modular and relocatable LED arrays. In general terms, as described more fully below in connection with the drawing figures, the interactive kiosk 100 includes a vertical support 104 that is connectable to an existing retail structure (not shown), an LED display screen that can be mounted to the vertical support, and an upright header panel 102 that can be mounted to the vertical support which surrounds the LED display panel 210. The LED display screen further comprises an LED module frame 200 with multiple LED module mountings 202, an array of LED modules 205 that can be mounted to the frame, and a translucent panel 210 removably supported in front of the LED module. The LEDs are programmed to display images or alphanumeric data preferably related to an intended purpose of the kiosk display. In accordance with a salient aspect of the invention, the array of LED modules comprises picture elements (pixels) on the order of about 2 mm each that, when illuminated by code executing in a processor 160, present a dynamic display of words, numbers, and images in a highly pixelated manner in stark contrast to the trend of retail displays which are using increasingly higher-definition monitors into the 4K range. Again, in accordance with a salient aspect of the invention, the translucent panel 210 is mounted relatively close to the array of LED modules so that images from the individual pixels illuminate the panel and are visible on the front face of the panel itself as a continuous image rather than as discrete, large individual LED lights. The translucent panel 210 softens the illumination effect of the LEDs by blurring the image seen from each individual picture element, thereby producing a blended image, rather than the sharp imager if the illumination from the 2 mm pixels were observed directly, which has a soothing aesthetic effect.

In accordance with another salient aspect of the invention, the array of LED modules 205, any filler panels (e.g., filler panels 223 and 224 shown in FIG. 8A), and the frame 200 that support these components behind the translucent panel 210 have compatible color tones behind the acrylic panel and adjacent (in the same plane as the LED attract panel) is needed in order to have a consistent appearance through front acrylic piece, and to eliminate an "outline" around the LED portion when not lit.

The interactive kiosk 100 further comprises several shelf units that are supported by respective structural backing layers. In the illustrated embodiment, there is an interactive top shelf configured to support one or more objects, and one or more lower shelves each comprising a recessed top surface. In different embodiments, the top shelf can be omitted, the lower shelves can be omitted, or they can vary in number. The interactive top shelf, when provided, includes a structural base layer that is connected to the vertical support in a cantilevered manner, a support frame supported above the base, an array of LED modules and one or more filler panels that are disposed within the frame, and a surface panel removably supported by the frame. A coating is provided in the support frame to color match with the LED modules and filler panels and the color of the frame itself, as described more fully below. Each of the lower shelves can include an insert made of magnetically-permeable material and a plurality of dividers each fit with a magnetic element positionable on the insert so that the dividers can slide horizontally across an upper surface of the insert to define slots between one another to receive and display objects therebetween.

Turning now to FIG. 1, a perspective view of an embodiment of an interactive kiosk 100 according to the present invention is provided, in which display items are shown on the top shelf, but not on the lower shelves for clarity, though it is understood that display items for purchase can be located on the lower shelves between dividers 132, 134, 142, 144. The kiosk 100 connects to a conventional electronic power source and conveys the electronic power to the parts mounted onto it through a conventional wire circuit system which forms no part of the present invention. The kiosk 100 includes an upright header panel 102. As shown more clearly in FIG. 6, the upright header panel is securely attachable to a vertical support 104, which, in turn, is attached to one or more brackets 108. The brackets attach the kiosk 100 to a wall or an existing retail structure (not shown), in any conventional manner, such as by using conventional mechanical fasteners, for example, a set of screws or rivets.

Referring again to FIG. 1, at the top portion of the kiosk, a vertically-oriented interactive LED display 110 is mounted on or otherwise supported on the header panel 102. In one or more implementations, the header panel 102 comprises an acrylic. In the embodiment depicted, the LED display 110 comprises a vertical screen or panel 210 (discussed below), behind which one or more LED modules 205 (shown in FIG. 2) are situated. The screen 210 has a degree of translucency which precludes direct observation of the LED modules, and instead causes a mild blurring of the image seen from in front of the screen.

The LED display 110 receives electronic power from an electronic power source, such as a connection to mains, preferably with conversion to a DC voltage, depending on the components being used. In some implementations, the kiosk can include a printed circuit board including control electronics for the LED display. More details for the LED display 110 and LED modules 205 are described in connection with FIG. 2 below.

A base unit elevates the header panel 102 and vertical LED display 110 and includes a backing 106 which can support several shelves 120, 130, 140 in a cantilevered manner. The top shelf 120 differs from the remaining shelves in a preferred embodiment. The top shelf has a top surface 121 ("platform") which supports the display of promoted items and products via holders 122, 124, 126. The top shelf can include an LED display 128 in addition to the LED display 110. Platform 121 and holders 122, 124, 126 can be color-coordinated with the LED display 110 as shown. In certain embodiments, the top shelf 120 further comprises secure connection 125, which can comprise conventional power cords and anti-theft locks/alarm devices (not shown in the FIGs), which permit objects connected thereto to be removed from the top shelf by a consumer, examined and tried, all while being powered and secured beyond a permitted degree of removal from the top shelf. One end of each secured connection is connected to an object on display while the opposite end passes through a respective product holder 122, 124 and 126 and the upright header panel 102 to the vertical support 108.

Using a computer program or a script available to a processor 160 of the kiosk, such as from a non-volatile memory 162 associated with the processor, information regarding the products to be promoted at any given time can be loaded and provided to display drivers for presentation on the LED displays 110, 128. A printed legend 129 can be positioned at the front of the platform 121 to provide a static message concerning each product (such as the product name, its price, and so on). The LED display 128 associated with the top shelf 120 can operate in coordination with vertical LED display 110 to display similar and/or complementary information.

Lower shelves 130, 140 provide a support for an orderly display of items that a consumer can purchase or otherwise take. For example, packaged versions of the products promoted and displayed on the platform 121 can be stocked on the lower shelf or shelves. The lower shelves 130, 140 can be adapted with specific features for this purpose, in accordance with certain embodiments of the invention. As shown, shelf 130 has a top surface that is recessed beneath the level of the outer edges of the shelf. An insert 135 is positioned within the top surface recess. A plurality of divider elements ("dividers"), e.g., 132, 134, is positioned and oriented in a front to rear alignment, i.e., perpendicular to the horizontal dimension and parallel to the width of the shelf. The dividers can have a height such that they fill the recess, are short of the recess, or project from the recess. The width of the dividers can be chosen to suit the needs of the retailer, and can be, for instance, about 1.0 to about 3.0 cm in width. Shelf 140 similarly includes insert 145 and dividers e.g., 142, 144. The dividers on both shelves 130, 140 are removable from the shelves and are also replaceable, allowing the number of dividers included on a shelf to be set according to a preselected number of rows of items to be displayed. Optionally, the dividers can include a magnetic element therein to affix the divider in place. This is described in co-pending U.S. patent application Ser. No. 15/850,333, filed on Dec. 21, 2017, entitled "Interactive Kiosk Shelves." In one or more implementations of the invention, a base deck 150 can be provided which connects to the backing 106 through mechanical fasteners, stabilizing the interactive kiosk on a floor of the retail store. In one or more implementations, the top surface 155 of base deck 150 can have a recessed insert and dividers as described in connection with disclosed in 130 and 140.

Figure 2:
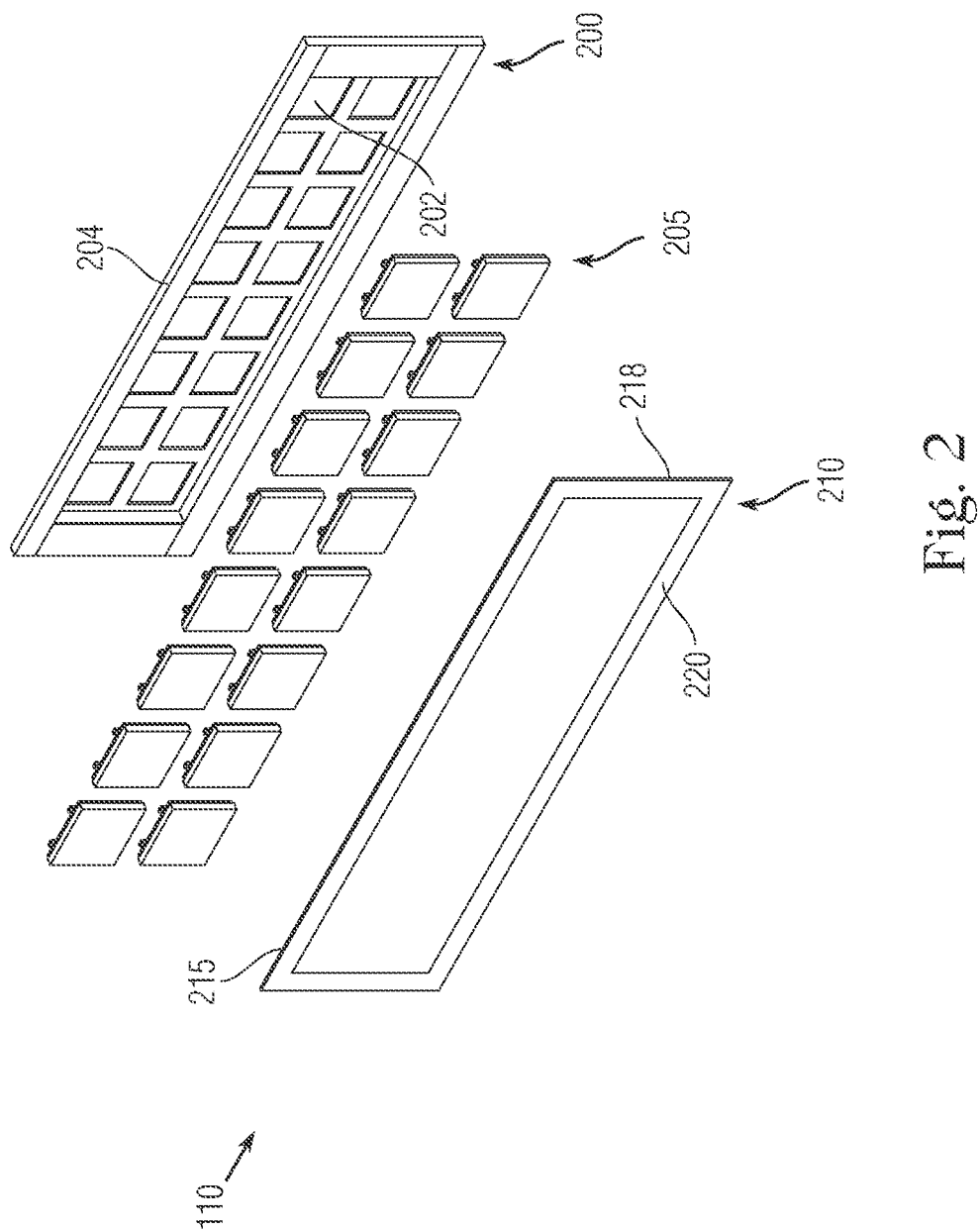
FIG. 2 is an exploded view of a front panel according to an embodiment of the present invention, such as the embodiment of FIG. 1.

FIG. 2 is an exploded view of an embodiment of the interactive kiosk described in FIG. 1, showing details of the LED display 110. The LED display 110 can comprise an LED module frame 200, one or more LED module arrays 205, and a translucent panel screen 210. The LED module frame 200 is securely attached to the vertical support 108 and is preferably not visible from behind the translucent panel screen 210. A conventional power source provides power through a conventional wire circuit system from the retail store to the kiosk 100, and, more particularly, to the LED module arrays 205 mounted in the frame 200. The LED module frame 200 is configured to receive an array of LED modules 205 through multiple LED mountings e.g., 202 in a removable manner. For instance, each LED module array 205 can be affixed to the LED module frame 200 using mechanical fasteners or by snap-fit connections.

In the embodiment shown in FIG. 2, the frame 200 includes a plurality of mountings e.g., 202 arranged in an 8×2 array occupying a substantial majority of the frame. However, other configurations are contemplated in which the array of mountings occupy a smaller portion of the frame, or in which the mountings are occupied with removable filler panels. In addition, the dimensions of the frame can vary to accommodate a larger display area. For instance, FIG. 7A shows a plan view of the frame 200 of a first size shown in FIG. 2. FIG. 7B shows another embodiment of a frame 250 having a larger size adapted for a larger display. Frame 250 includes a plurality of mountings e.g., 252 arranged in a 16×8 array, on which 128 LED modules can be mounted.

In one or more embodiments, the frame 200 (and frame 310 described below) can provide a signal to the processor 160 that an LED module is mounted at a particular position in the frame, while any filler panels or empty slots in the frame can be distinguished as not including an LED module. In this way, the attract program which plays in the processor and is to be displayed on the LED display 110 (or display 128) can be adjusted to suit the current complement of LED modules 205, 315 (see FIGS. 2 and 3) loaded into the frames. Alternatively, a program executing in the processor 160 can provide a configuration message to alert warn the installer that the program to be displayed is not compatible with the number or location of LED modules installed in the kiosk.

Figure 1A:
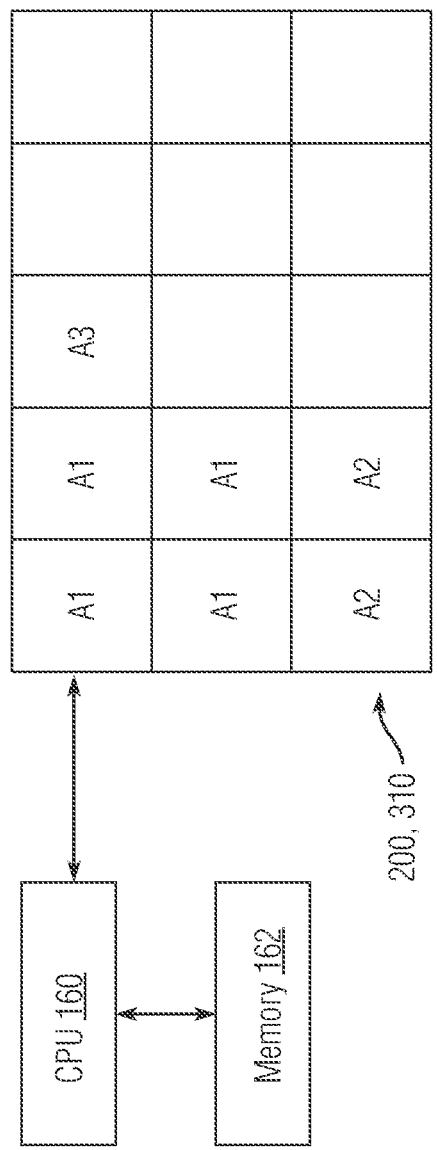
FIG. 1A is a schematic view of a support frame with a set of LED array modules installed at certain locations, showing communication to a processor and memory according to an embodiment of the present invention, such as the embodiment of FIG. 1.

Referring briefly to FIG. 1A, the interactive kiosk 100 includes can execute one or more programs stored in the memory 162 in order to drive the LED arrays and provide an attract mode to draw customer's attention, and to respond to selections made by the users, such as the removal of a product from product holders 122, 124, 126, by providing information on the display panel 110 appropriate to that product. The processor (CPU) 160 executes a program or otherwise implements a script stored in the memory 162, and preferably does so in response to which locations of the frame 200, 310 have LED modules seated therein. In particular, in one or more embodiments of the invention, the processor 160 can monitor the frame or signals over the frame's signal bus concerning which array locations have been provided with LED modules. In FIG. 1A, a 5×3 array of locations is shown, and has LED arrays loaded in seven of fifteen frame locations, as designated by the symbol "A." In one or more embodiments, the LED array module 205, 315 located in any particular location of the frame can be different than the module located elsewhere. Thus, as illustrated, four of the locations have LED array module of type "A1," while two locations have LED array module of type "A2," and one location has an LED array module of type "A3." Each array type can have the same exterior dimension (e.g., 5 inches square), while the density of pixels might be changed in certain implementations. In accordance with a further aspect of the invention, the arrays can self-identify their type, or they can identify their type based on their mechanical or electrical connections to the frame. The absence of an LED array module, or the inclusion of a filler panel can be treated the same or differentiated, in different embodiments.

Figure 8A:
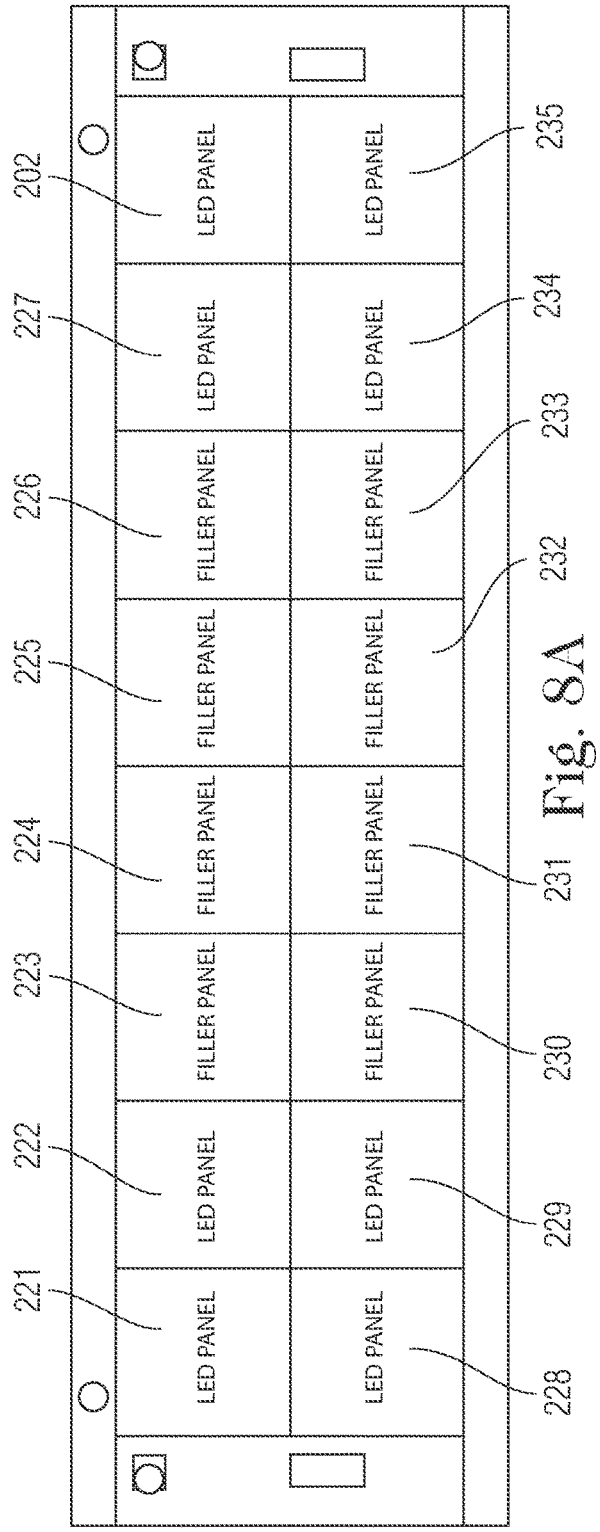
FIGS. 8A and 8B show alternative arrangements of LED modules and filler panels seated in a frame according to embodiments of the present invention.
Figure 8B:
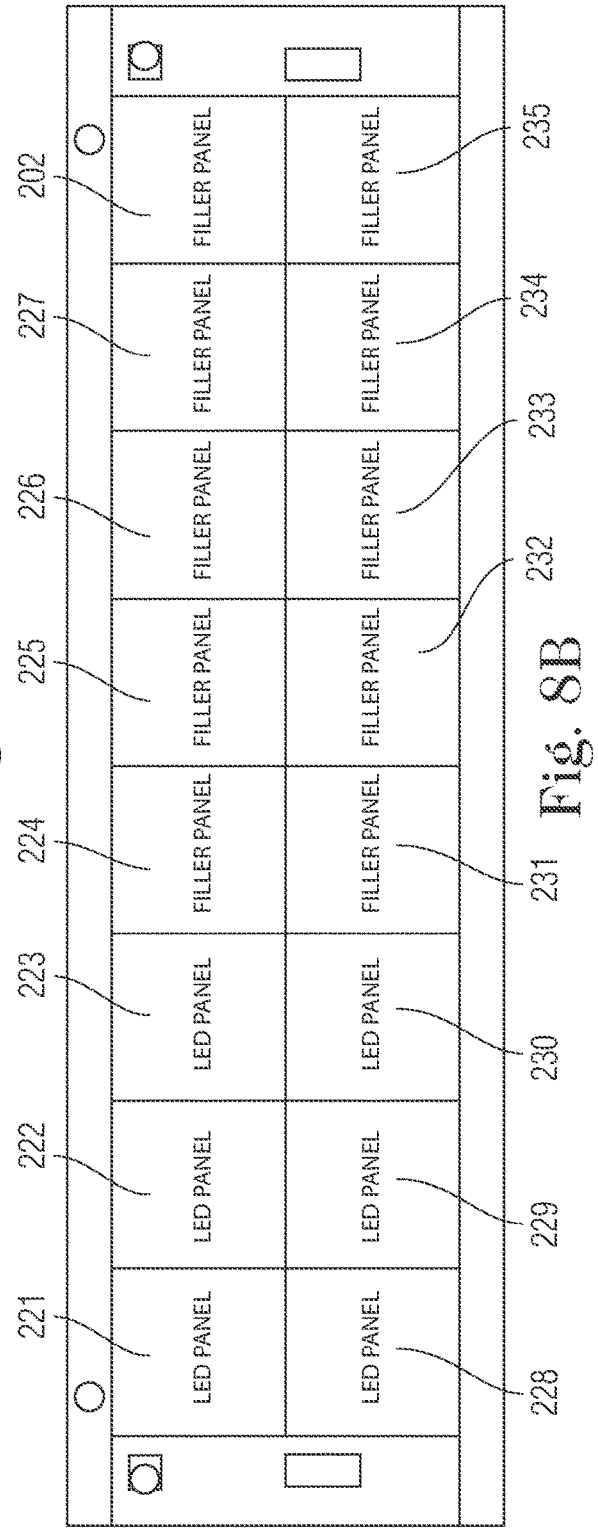

FIGS. 8A and 8B illustrate different configurations of LED modules and filler panels in a 8×2 frame. In FIG. 8A mountings 221, 222, 227, 202, 228, 229, 234 and 235 include LED modules, while mountings 223, 224, 225, 226, 230, 231, 232 and 233 are fitted with filler panels. The filler panels are preferably coated with a material that is the same or similar color as the frame. It is noted that, in the depicted embodiments, the LED modules and filler panels are sized so as to meet at their respective edges so that the internal grid lines of the frame are covered by the LED modules and/or filler panels. This arrangement allows the LED modules to provide a continuous display over any span in which they are adjacent to each other, while the filler panels, in one embodiment, are aligned generally planar with the front face of the LED modules to provide a continuous plane in front of the frames 200, 310. In the configuration shown in FIG. 8A, eight LED modules are installed, with four modules on the left and four modules right side of the frame, but no LED modules are installed in the middle of the frame. Consequently, images can appear on the sides of the display, but not in the center of the display. This bifurcated arrangement provides a noticeable aesthetic effect useful for some types of presentations. In contrast, in the alternative configuration shown in FIG. 8B, LED modules are installed in mountings 221, 222, 222, 223, 228, 229 and 230 shown at the left of the frame; filler panels are installed in mountings 224-227, 202 and 231-235. To attain the configuration of FIG. 8B from the configuration of FIG. 8A, in addition to rearranging two LED modules from the mountings on the right e.g., 202, 235 to mountings 223, 230, two LED modules are removed configuration and replaced with filler panels. The installer has the option to use different numbers of LED modules (i.e., from one module up to the number of mountings) in a range of different configurations with filler panels to achieve different display effects. In addition, this flexibility provides for reuse of the display panel for presentations of different sizes.

In an embodiment, the frame, LEDs and filler panels are covered by the translucent panel 210. It is desirable for the display to present a uniform, soothing appearance apart from any illuminated portions, both to highlight the illuminated content of the display, and to complement the appearance of the kiosk as a whole. Referring to FIG. 8A as an example, it is seen that the exposed portions of the display behind the translucent screen include the arrangement of LED modules and filler panels, as well as the outside edge of the frame that surrounds the arrangement of LED modules and filler panels. Therefore, to achieve the uniform appearance, it is preferable for the colors of the front edge of the frame, unilluminated LED modules, and filler panels to have a similar, preferably light color. This can be achieved, for example, by coating the edge of the frame and filler panels with a similar color, present as similar appearance as possible so that distinct components are not observable through the translucent panel. In one embodiment, the similar color is the same color. In another embodiment, the similar color is a matching color. Differences in color can be selected subjectively, but preferably are objectively measured using any conventional approach, such as Euclidean color-distance calculation, so that the difference is imperceptibly or acceptably close to a reference color. In other words, the similar color can be a matching color which appears to be the same. Using this construction, the structural elements behind the translucent panel 210 are imperceptible when the LED modules 205 are not lit, and only the illumination shines through with minimal or no shadow due to the mounting of the LED modules 205.

In the embodiment illustrated, the LED modules and filler panels are sized to overlap the frame, at least within its interior perimeter. As such, to the extent structural elements can be perceived from behind the translucent panel, a uniform appearance is perceived from behind apart from any illuminated portions, both to highlight the illuminated content of the display, and to complement the appearance of the entire kiosk. Referring to FIG. 8A as an example, it is seen that the exposed portions of the display behind the translucent screen include the arrangement of LED modules and filler panels, as well as the outside edge of the frame that surrounds the arrangement of LED modules and filler panels. Therefore, to achieve the uniform appearance, it is preferable for the colors of the front edge of the frame, unilluminated LED modules, and filler panels to have similar, preferably light color. This can be achieved, for example, by coating the edge of the frame and filler panels with a similar color, present as similar appearance as possible so that distinct components are not observable through the translucent panel.

Figure 9:
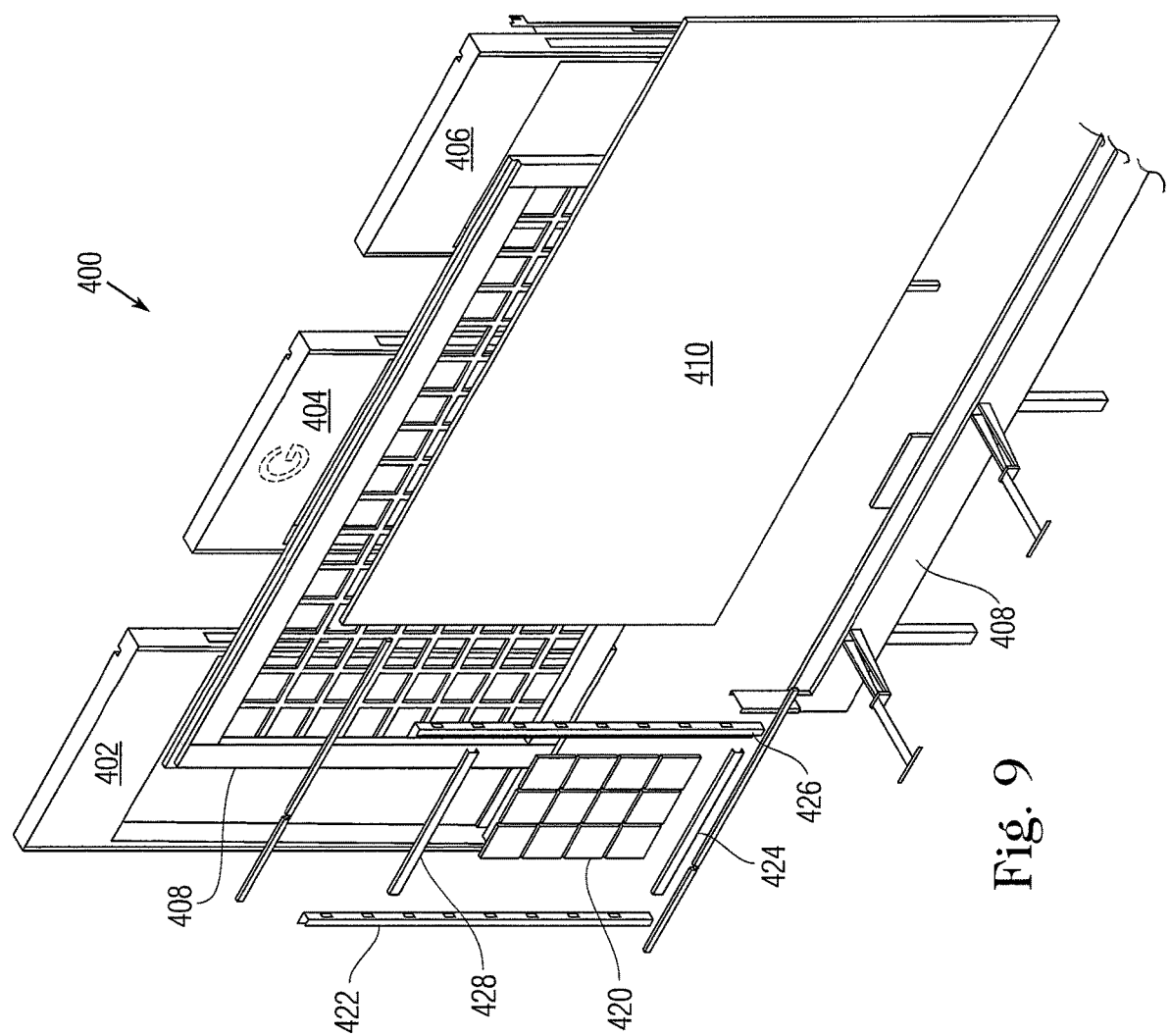
FIG. 9 is an exploded view of a front panel of an interactive kiosk according to another embodiment of the present invention.

Another exemplary LED modular configuration according to the present invention is shown in FIG. 9, which is an exploded view of a wide kiosk display 400. FIG. 9 depicts an alternative way in which modular LED can be positioned and secured to the kiosk display. To accommodate the width of the display, the header panel is divided into three sections 402, 404, 406. The header panel sections 402, 404, 406 are attachable to a fixture 408 positioned at the top of the base of the kiosk (not shown). A frame 408 with a plurality of mounting spaces is positioned in front of header panel sections, and a translucent panel 410 is positioned in front of the frame. In some implementations, the width of the translucent panel can range between 72 and 96 inches, and the height can range between 24 to 48 inches, resulting in a large display surface area. In some cases, it may be desired to use only a relatively small portion of the surface area for interactive display features. A preset region of the screen area can be allocated to LED module elements and the module elements can be semi-permanently affixed in the preset region. In the depicted example, a 4×3 array of LED modules 420 is positioned at the lower left portion of the display. Several rail elements 422, 424, 426, 428 can be used as borders surrounding the region in which LED modules are installed, and for semi-permanently coupling the LED modules 420 to the frame 408 or header panel 402.

Regarding the LED modules themselves, they can vary in size, type, resolution, and brightness. Example module sizes include, but are not limited to 5×5, 5×4, 5×3, 4×4, 4×3 (in inches). The pixel pitch of the LED modules can be approximately 2 mm. Exemplary LED modules that can be used include the LEDCON 64×64 P2 manufactured by LEDCON Systems GmbH of Rheine, Germany. As noted, the filler panels can be sized to match the size of any given LED module, or a combination of modules such that one filler panel can seat in the frame where two LED modules otherwise could be housed, or three LED modules, or four LED modules, and so on.

In order monitor the locations of installed LED array modules, the processor 160 receives information concerning the type and location of the installed LED array modules without manual user input. Thus, in embodiments that monitor the locations of installed LED array modules, a change in the complement of installed LED array modules, in other words, a removal of an LED array module or installation of a new or different LED array module, is detected and the detection includes an identification of the location and type of module. That information is then stored in the memory 162 and the stored information can be used to test the display program or script requirements against the current configuration. If the display program or script requires that LED array modules be arranged differently, or with different specifications, a validation signal which can comprise a message can be output by the processor 160 to identify that the current configuration is not compatible with the intended program or script. In this way, the requirements for the overall program or script can be tested before the kiosk is fully assembled to better ensure that the kiosk is ready to use. As will be appreciated, the detection can be responsive to the presence or absence of an LED module at a given location in the frame.

The LED module frame 200 can include a power and signal bus which conveys electronic power and signals to the individual LED modules in the array 205. Power to the LED module frame 200, and to the processor 160, memory 162, and other components of the kiosk 100, can be controlled by an on-off switch. The on-off switch can be controlled by a wired or a remote controller. In some implementations, the kiosk includes a printed circuit board (PCB) for adapted for control of the LED modules. In such implementations, the PCB can be directly coupled to a local electrical power source (i.e., the mains) rather than the frame or modules themselves. The printed circuit board, which can include one or more processors and/or LED controllers, can be coupled to the individual LED modules via cables (e.g., ribbon or network cables) via one or more intermediary devices such as sender and receiver cards.

In one or more embodiments, the translucent panel screen 210 comprises an acrylic. The translucent panel screen 210 has a rear surface 215 and a front surface 220 and is removably supported by the LED module frame 200, in a mechanical manner, such as by magnets (e.g., magnetic rubber strips). In one or more embodiments, the rear surface 215 can include a silkscreen layer 218 having a static image thereon which is viewed through the acrylic material.

Even though the translucent panel 210 precludes direct viewing of the LED arrays 205 and frame 200, it is desirable to provide the frame 200 with a coating 204 which has a color generally corresponding to the color of the individual array of LED modules so that the area behind the translucent panel has a more uniform albedo. In one or more embodiments, the coating 204 comprises a polyester triglycidyl isocyanurate (PTIC) powder. Such a powder can be applied so as to provide a matte gloss and a smooth finish, for instance, in an "acoustic white" PRSM 80010 finish. Similarly, it is preferable that any filler panels used in the frame be coated in the same or similar manner to corresponding to the color of the frame and individual array of LED modules. It is understood that if the LED modules and/or filler panels are suitably sized, in some implementations only the perimeter of the frame needs to be coated or the coating can be omitted in embodiments in which the frame is obscured by the LED modules and filler panel.

Figure 3:
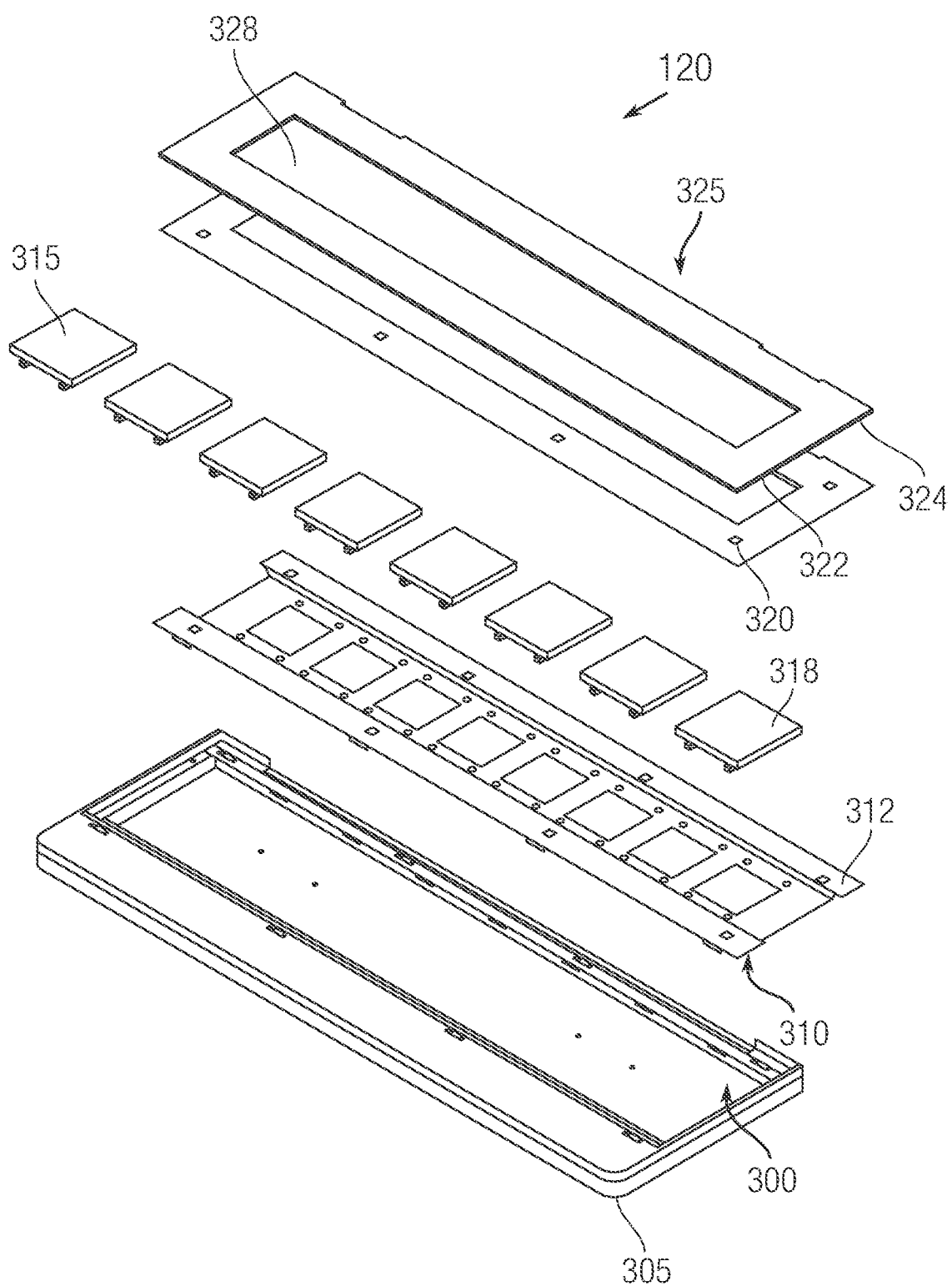
FIG. 3 is an exploded view of a top shelf panel according to an embodiment of the present invention, such as the embodiment of FIG. 1.

FIG. 3 is an exploded view of an embodiment of the top shelf 120 in FIG. 1. The top shelf 120 comprises a base 300 which is connected to the backing 106 in a cantilevered manner. An LED display 128 is at the top, below and optionally spaced below a translucent panel upon which the holders 122, 124, 126 rest, and can be substantially as described in connection with FIG. 1. As with the vertical display, power is provided to the top shelf 120 in a conventional manner. A trim 305 can be securely attached to the base to shield the display components from view. In the embodiment shown in FIGS. 1 and 3, the LED display 128 comprises a support frame 310, which can include a coating 312, an array of LED modules 315, one or more filler panels 318 (one shown on the right), a surface panel 325, and an optional panel support/spacer 320. The support frame 310 can be constructed generally as described above in connection with frame 200 so as to have a power and signal bus and addressability, also as previously described. The frame 310 is supported above the base 300. An array of LED modules 315 seated in the frame 310 can receive power and signals from the frame through associated electronic circuits. Power can be controlled to the display 128 in the same manner and at the same time as to display 110. The coating 312 has a color generally corresponding to the color of the array of LED modules 315 and any filler panels 318. A translucent top panel covers the display 128.

In one or more embodiments, the support frame 310 can house one or more filler panels 318. The array of LED modules 315 and the filler panels 318 can be removably affixed to the support frame 310 using mechanical fasteners. If provided, the one or more filler panels 318 can be disposed adjacent to the LED modules 315. The LED modules 315 can mount differently than the filler panels in embodiments in which the presence and identity of an LED array module is sensed.

In one or more embodiments, the surface panel 325 is removably supported by the support frame 310, preferably through screws and rubber magnetic strips. The surface panel screen is preferably translucent, not transparent, and can comprise an acrylic in a particular embodiment therefor. Moreover, an optional panel support can be placed in between the surface panel 325 and the support frame 310, securely connecting the support frame 310 and the surface panel 325 and spacing the panel from the LED arrays to provide a prescribed blur to the underlying LED array as seen through the translucent panel. The surface panel 325 has a rear surface 322 facing the support frame 310 and an opposite, front surface 328. As with the vertical panel 110, the rear surface 322 of the surface panel screen 325 can include a silkscreen layer 324 having a static image thereon.

Figures 4, 5:
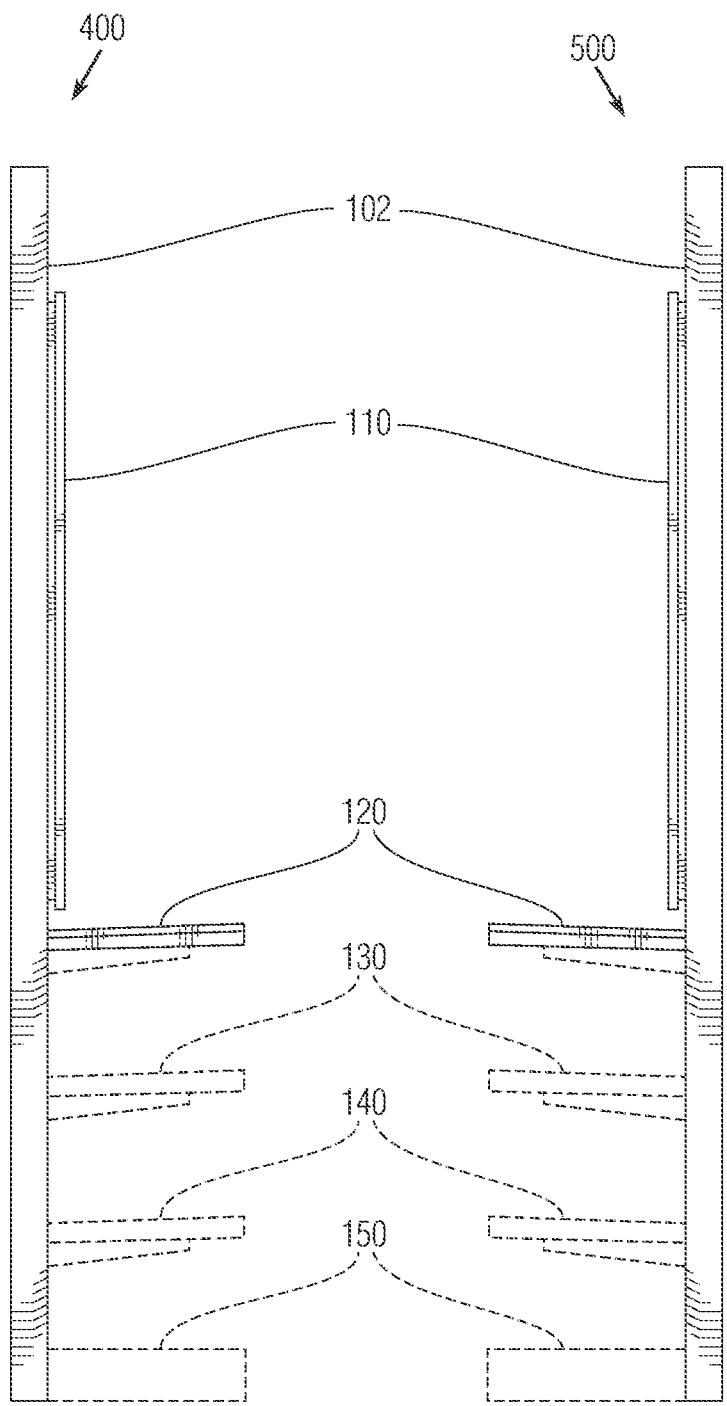
FIG. 4 is a right side-view of an interactive kiosk according to an embodiment of the present invention, such as the embodiment of FIG. 1.
FIG. 5 is a left side-view of an interactive kiosk according to an embodiment of the present invention, such as the embodiment of FIG. 1.

FIG. 4 is a right-side view and FIG. 5 is a left side view of the interactive kiosk arranged as shown in FIG. 1. As shown in the right side-view 400 and the left side-view 500, the interactive LED display panel 110 can overlap a portion of the upright header panel 102. In other embodiments, the display panel 110 can be sized smaller than an opening in the header panel 102 so that it seats behind the plane of the header panel, aligned in the same plane as the header panel, or in front of the plane of the header panel, as shown. Also, the shelves 120, 130, 140, and the base 250 can be arranged horizontally (as shown), or at a slight angle without departing from the teachings herein.

Figure 6:
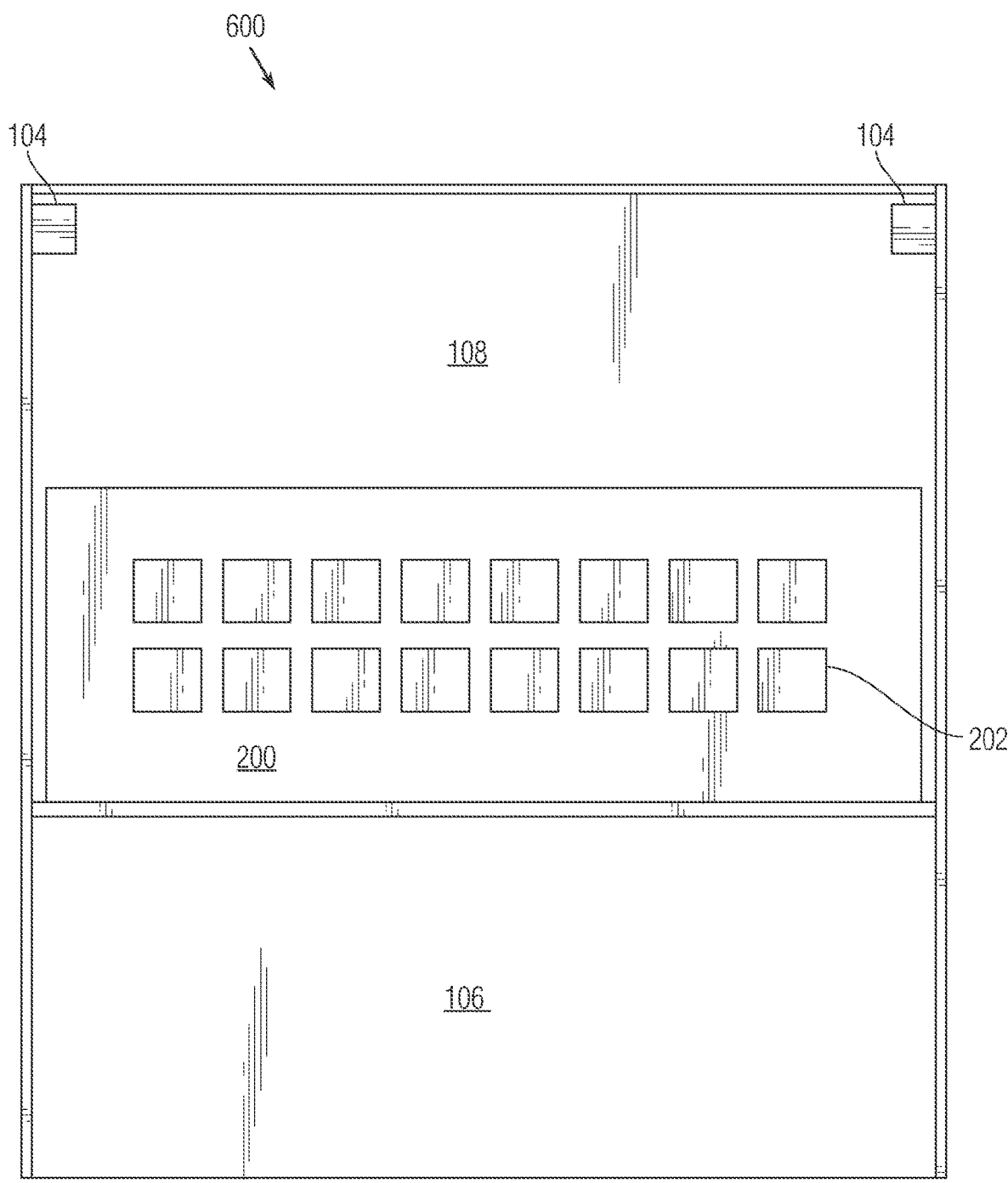
FIG. 6 is a back view of an interactive kiosk according to an embodiment of the present invention, such as the embodiment of FIG. 1.

Turning to FIG. 6, a back-side view of an interactive kiosk according to the embodiments described is illustrated. The back view 600 shows that the brackets 104 can be located at the top right and top left corner on the vertical support 108 of the interactive kiosk, for engagement to a retail structure. As will be understood, the brackets 104 are mounted relative to the vertical support 108, as needed, or in a moveable manner, in order to affix the kiosk 100 to corresponding structure in a retail store.

It will be appreciated that more than one kiosk can be mounted to the retail store, and that replacement of the header panels 102 and base panels 106 with of wider or narrower units can be used with the remaining components to adapt the kiosk to the needs of a particular display goal.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and they are not to be construed as limiting. However, it is recognized these terms could be used with reference to a viewer. Accordingly, no limitations are implied or to be inferred.

Also, the phraseology and terminology used herein is for description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An interactive display for a kiosk for mounting on an existing retail structure in order to display one or more objects, comprising:
   an LED module frame having a coated perimeter and an internal grid, the grid including a plurality of mountings adapted to support LED modules and filler panels; and
   one or more LED modules comprising an array of LEDs, the modules being removably supported on one or more of the mountings;
   a processor coupled to and adapted to control each of the LED modules, wherein the processor is configured to detect and respond to the presence and location of the LED modules within the frame; and
   one or more removable filler panels adapted to occupy any one or more unoccupied mountings of the plurality of mountings,
   wherein the one or more filler panels have a coating similar in color to the color of the perimeter of the frame.

2. The interactive display of claim 1, wherein the processor is coupled to the LED modules via one or more electrical cables.

3. The interactive display of claim 1, wherein the one or more LED modules and one or more filler panels are adapted to securely couple to the LED module mountings on the frame by snap-fit connections.

4. The interactive display of claim 1, wherein the one or more LED modules and one or more filler panels are adapted to securely couple to the LED module mountings on the frame by mechanical fasteners.

5. The interactive display of claim 1, wherein the one or more LED modules occupy a subset of the available LED module mountings in the frame.

6. The interactive display of claim 1, further comprising a translucent panel positioned in front of and covering the LED module frame and LED modules.

7. The interactive display of claim 1, wherein the one or more LED modules range from about 3 inches to about 5 inches in length, and range from about 3 inches to about 5 inches in width.

8. The interactive display of claim 1, wherein the one or more LED modules and one or more the filler panels have compatible sizes such that one or more LED modules can be swapped in position on the LED module frame for one or more filler panels.

9. The interactive display of claim 8, wherein the one or more filler panels are of the same size as the one or more LED modules.

10. The interactive display of claim 8, wherein at least one of the filler panel is the same size as two of the LED modules and wherein two LED modules can be swapped in position on the LED module frame for one filler panel.

11. An assembly for inclusion in a kiosk, comprising:
   an LED module frame having a first color and defining an internal grid, the grid including a plurality of mountings adapted to support LED modules; and
   one or more LED modules each comprising an array of LEDs, the modules being removably supported on the mountings;
   a processor coupled to and adapted to control each of the LED modules, wherein the processor is configured to detect and respond to the presence and location of the LED modules within the frame;
   one or more removable filler panels having a color that substantially matches the first color of the LED module frame, each filler panel being adapted to occupy any of the plurality of mountings in place of an LED module so as to define, together with any LED modules supported on the mountings a continuous plane; and
   a translucent panel supported in front of the continuous plane.

12. The assembly of claim 11, wherein the one or more LED modules and one or more the filler panels have compatible sizes such that one or more LED modules can be swapped in position on the LED module frame for one or more filler panels.

13. The assembly of claim 12, wherein the one or more filler panels are of the same size as the one or more LED modules.

14. The assembly of claim 12, wherein at least one of the filler panel is the same size as two of the LED modules and wherein two LED modules can be swapped in position on the LED module frame for one filler panel.

15. The assembly of claim 11, wherein the one or more LED modules occupy a subset of the available LED module mountings in the frame and wherein the processor detects and responds to either the presence or absence of a module with a validation signal.

* * * * *